No. 696,998. Patented Apr. 8, 1902.
N. J. McLEAN.
NUT LOCK.
(Application filed Oct. 4, 1901.)
(No Model.)
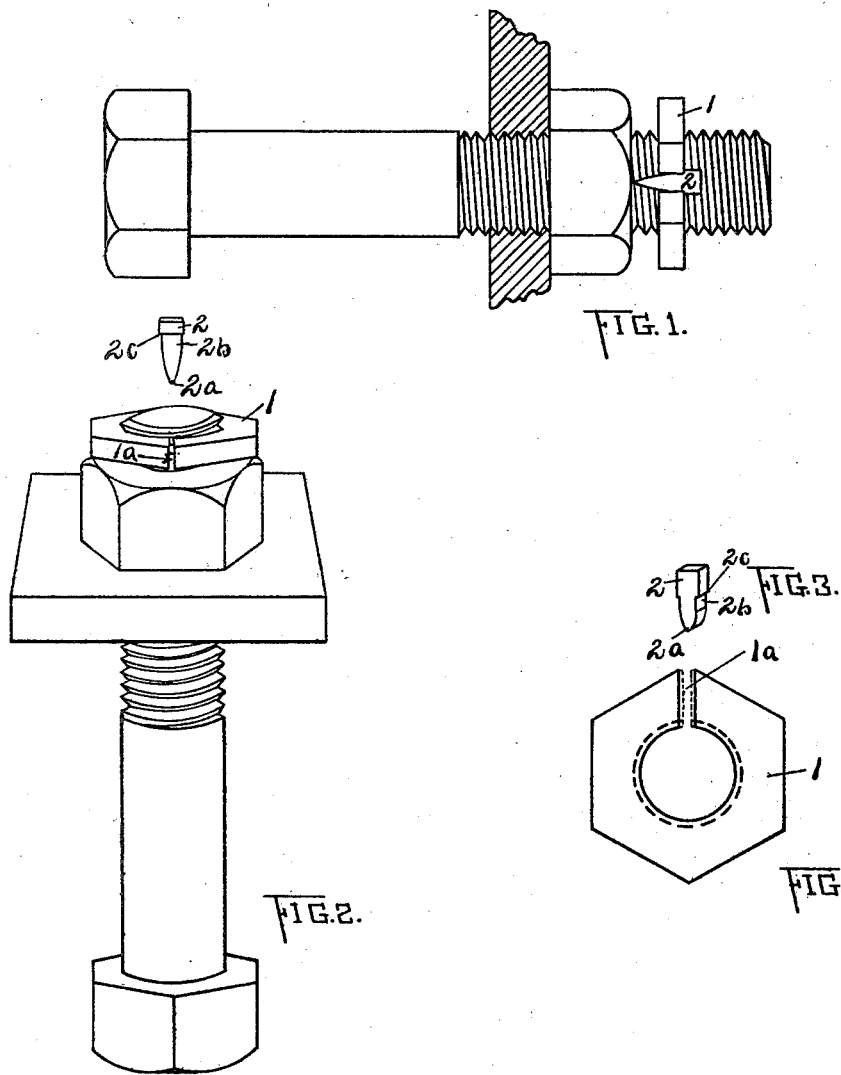
WITNESSES:
Norman J. McLean INVENTOR
BY
Geo. B. Willcox ATTORNEY

UNITED STATES PATENT OFFICE.

NORMAN J. McLEAN, OF WEST BAY CITY, MICHIGAN.

NUT-LOCK.

SPECIFICATION forming part of Letters Patent No. 696,998, dated April 8, 1902.

Application filed October 4, 1901. Serial No. 77,600. (No model.)

*To all whom it may concern:*

Be it known that I, NORMAN J. MCLEAN, a citizen of the United States, residing at West Bay City, in the county of Bay and State of Michigan, have invented certain new and useful Improvements in Nut-Locks; and I do hereby declare the following to be a full, clear, and exact description of the invention, such as will enable others skilled in the art to which it appertains to make and use the same.

This invention is a nut-lock, and pertains more particularly to that class of nut-locks employing a threaded spring-washer to lock the nut in place.

The objects of my invention are, first, to produce a nut-lock, that can be manufactured at small expense, that can be applied to standard bolts without altering the construction of the bolt or the nut; second, to provide a nut-lock that can be easily run on the thread of the bolt until it almost reaches the head of the nut and then by a few turns with a wrench the nut-lock is set down upon the head of the nut and automatically grips the bolt-thread so tightly that it cannot become accidentally unscrewed, and consequently holds the nut firmly locked.

With these objects in view my invention consists in the device illustrated in the accompanying drawings, in which—

Figure 1 is a side view of a bolt and nut with the nut-lock in position ready to be screwed down upon the nut by a wrench. Fig. 2 is a perspective view of a bolt, showing the nut-lock with the key detached. Fig. 3 is a perspective view of the key, and Fig. 4 is a top view of the nut-lock.

As is clearly shown in the drawings, the nut-lock consists in a polygonal washer or thin nut 1, internally threaded and adapted to screw on the bolt. At one side the washer has a radial slit $1^a$. The washer is preferably made of spring-steel or other elastic material, and a key 2 is driven into the slit to force its edges apart. The washer is threaded internally, so that when the edges of the slit are forced apart by the key the washer can be easily screwed upon the bolt by hand; but when the key is removed the washer contracts, tightly gripping the bolt-threads and locking the washer to the bolt.

In practice I prefer to provide each washer with a key arranged to automatically release the washer when screwed down upon the nut by means of a wrench. The lower part of the key is tapered and terminates in a blunt wedge-point $2^a$. The upper portion of the key has flat parallel sides $2^b$ and may be provided with shoulders $2^c$, which prevent the key from being pushed too far through the slit.

The operation of the key is as follows: Having been pressed into the slit, so that the lower part of the parallel portion $2^b$ is about half through the thickness of the washer, the washer is screwed down upon the nut, and as it advances the nut forces the key back through the slit. When the washer has almost reached the nut, its tendency to contract causes the key to drop out, and the spring-washer then tightly grips the bolt-threads. With a properly-shaped key the amount that the washer must be screwed down after the key has dropped out in order to set firmly down upon the face of the nut is very small. No injury is done either to the bolt-thread or to the thread in the washer by the small amount of movement after the key is released, as would be the case if the tightly-clamping spring-washer were screwed along the bolt without having its pressure released by the key.

By the means above described I have produced a simple, economical, and efficient nut-lock that can be run on the bolt by hand until it comes almost into contact with the nut and then upon being turned with a wrench automatically grips the bolt and upon coming in contact with the face of the nut effectually locks it against unscrewing. In order to remove the washer from the bolt, it is only necessary to insert a wedge in the contracted slit to force the sides of the slit apart, thus partly opening the washer and releasing its grip upon the bolt-threads. It is not necessary to provide a special wedge for this purpose, as an ordinary cold-chisel or similar pointed tool answers the purpose well.

What I claim as my invention, and desire to secure by Letters Patent, is—

1. A nut-lock comprising an internally-threaded elastic washer, having a slit extending from the periphery to the threaded hole; together with a key inserted in said slit to hold its edges normally apart, said key having a parallel-sided upper portion and a blunt wedge-point, substantially as described.

2. A nut-lock comprising an internally-threaded polygonal spring-washer having a slit extending from the periphery to the threaded hole, the sides of said slit being normally wedged apart; together with a wedge adapted to be released from the washer, by contact with the nut to be locked, when the washer is screwed down upon the nut, substantially as described.

In testimony whereof I affix my signature in presence of two witnesses.

NORMAN J. McLEAN.

Witnesses:
  I. GOULD,
  GEO. B. WILLCOX.